(12) United States Patent
Wilkins et al.

(10) Patent No.: US 7,481,929 B2
(45) Date of Patent: Jan. 27, 2009

(54) WATER TREATMENT SYSTEM

(75) Inventors: Frederick Wilkins, Pepperell, MA (US); Anil Jha, Lincoln, MA (US); Li-Shiang Liang, Harvard, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 0 days.

(21) Appl. No.: 11/943,446

(22) Filed: Nov. 20, 2007

(65) Prior Publication Data

US 2008/0116136 A1 May 22, 2008

Related U.S. Application Data

(62) Division of application No. 10/856,264, filed on May 27, 2004, now Pat. No. 7,329,358.

(51) Int. Cl.
*F02M 37/22* (2006.01)
(52) U.S. Cl. .................. 210/243; 210/263; 210/502.1; 210/503; 210/505; 210/290; 210/282; 210/143; 222/52; 222/189.06
(58) Field of Classification Search ............... 210/243, 210/263, 502.1, 503, 505, 290, 282, 143; 222/52, 189.06
See application file for complete search history.

(56) References Cited

U.S. PATENT DOCUMENTS

| | | | |
|---|---|---|---|
| 2,514,415 A | 7/1950 | Rasch | |
| 2,681,319 A | 6/1954 | Bodamer | |
| 2,681,320 A | 6/1954 | Bodamer | |
| 2,788,319 A | 4/1957 | Pearson | |
| 2,794,777 A | 6/1957 | Pearson | |
| 2,815,320 A | 12/1957 | Kollsman | |
| 2,854,394 A | 9/1958 | Kollsman | |
| 2,923,674 A | 2/1960 | Kressman | |
| 2,943,989 A | 7/1960 | Kollsman | |
| 3,014,855 A | 12/1961 | Kressman | |
| 3,074,864 A | 1/1963 | Gaysowski | |
| 3,099,615 A | 7/1963 | Kollsman | |
| 3,148,687 A | 9/1964 | Dosch | |
| 3,149,061 A | 9/1964 | Parsi | |
| 3,149,062 A | 9/1964 | Gottschal et al. | |
| 3,165,460 A | 1/1965 | Zang et al. | |
| 3,291,713 A | 12/1966 | Parsi | |
| 3,330,750 A | 7/1967 | McRae et al. | |
| 3,341,441 A | 9/1967 | Giuffrida et al. | |
| 3,375,208 A | 3/1968 | Duddy | |

(Continued)

FOREIGN PATENT DOCUMENTS

CA    2316012 A1    11/2001

(Continued)

OTHER PUBLICATIONS

Buros, O.K., "The ABCs of Desalting," Second Edition, published by the International Desalination Association, Topsfield, MA, U.S.A. (2000).

(Continued)

*Primary Examiner*—Chester T Barry (57) ABSTRACT

A system and process for treating water are described. Water may be purified by passing feed water through an electrochemical deionization device. The water may be suitable for cooking, washing, and beverage production.

28 Claims, 2 Drawing Sheets

U.S. PATENT DOCUMENTS

| | | |
|---|---|---|
| 3,627,703 A | 12/1971 | Kojima et al. |
| 3,630,378 A | 12/1971 | Bauman |
| 3,645,884 A | 2/1972 | Gilliland |
| 3,686,089 A | 8/1972 | Korngold |
| 3,755,135 A | 8/1973 | Johnson |
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,358,545 A | 11/1982 | Ezzell et al. |
| 4,374,232 A | 2/1983 | Davis |
| 4,430,226 A | 2/1984 | Hedge et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,032,265 A | 7/1991 | Jha et al. |
| 5,064,097 A | 11/1991 | Brog et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,346,624 A | 9/1994 | Libutti et al. |
| 5,346,924 A | 9/1994 | Giuffrida |
| 5,352,364 A | 10/1994 | Kruger et al. |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,415,786 A | 5/1995 | Martin et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Batchelder et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,593,563 A | 1/1997 | Denoncourt et al. |
| 5,599,614 A | 2/1997 | Bahar et al. |
| 5,670,053 A | 9/1997 | Collentro et al. |
| 5,679,228 A | 10/1997 | Batchelder et al. |
| 5,679,229 A | 10/1997 | Goldstein et al. |
| 5,714,521 A | 2/1998 | Kedem et al. |
| RE35,741 E | 3/1998 | Oren et al. |
| 5,736,023 A | 4/1998 | Gallagher et al. |
| 5,759,373 A | 6/1998 | Terada et al. |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,915 A | 2/1999 | Ganzi et al. |
| 5,891,328 A | 4/1999 | Goldstein |
| 5,925,240 A | 7/1999 | Wilkins et al. |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |

| | | | | | | |
|---|---|---|---|---|---|---|
| 6,099,716 | A | 8/2000 | Molter et al. | DE | 3238280 A1 | 4/1984 |
| 6,103,125 | A | 8/2000 | Kuepper | DE | 4016000 C2 | 11/1991 |
| RE36,972 | E | 11/2000 | Baker et al. | DE | 44 18 812 A1 | 12/1995 |
| 6,146,524 | A | 11/2000 | Story | DE | 199 42 347 A1 | 3/2001 |
| 6,149,788 | A | 11/2000 | Tessier et al. | EP | 0170895 B1 | 2/1986 |
| 6,156,180 | A | 12/2000 | Tessier et al. | EP | 0 503 589 A1 | 9/1992 |
| 6,171,374 | B1 | 1/2001 | Barton et al. | EP | 0 621 072 A2 | 10/1994 |
| 6,187,154 | B1 | 2/2001 | Yamaguchi et al. | EP | 0 680 932 A2 | 11/1995 |
| 6,187,162 | B1 | 2/2001 | Mir | EP | 0803474 A2 | 10/1997 |
| 6,190,528 | B1 | 2/2001 | Li et al. | EP | 0 870 533 A1 | 10/1998 |
| 6,190,553 | B1 | 2/2001 | Lee | EP | 1 068 901 A2 | 1/2001 |
| 6,190,558 | B1 | 2/2001 | Robbins | EP | 1068901 A2 | 1/2001 |
| 6,193,869 | B1 | 2/2001 | Towe et al. | EP | 1075 868 A2 | 2/2001 |
| 6,197,174 | B1 | 3/2001 | Barber et al. | EP | 1 101 790 A1 | 5/2001 |
| 6,197,189 | B1 | 3/2001 | Schwartz et al. | EP | 1 106 241 A1 | 6/2001 |
| 6,214,204 | B1 | 4/2001 | Gadkaree et al. | EP | 1172145 A2 | 1/2002 |
| 6,228,240 | B1 | 5/2001 | Terada et al. | EP | 1222954 A1 | 7/2002 |
| 6,235,166 | B1 | 5/2001 | Towe et al. | EP | 1506941 A1 | 2/2005 |
| 6,248,226 | B1 | 6/2001 | Shinmei et al. | GB | 776469 | 6/1957 |
| 6,254,741 | B1 | 7/2001 | Stuart et al. | GB | 877239 | 9/1961 |
| 6,258,278 | B1 | 7/2001 | Tonelli et al. | GB | 880344 | 10/1961 |
| 6,267,891 | B1 | 7/2001 | Tonelli et al. | GB | 893051 | 4/1962 |
| 6,274,019 | B1 | 8/2001 | Kuwata | GB | 942762 | 11/1963 |
| 6,279,019 | B1 | 8/2001 | Oh et al. | GB | 1048026 | 11/1966 |
| 6,284,124 | B1 | 9/2001 | DiMascio et al. | GB | 1137679 | 12/1968 |
| 6,284,399 | B1 | 9/2001 | Oko et al. | GB | 1 381 681 A | 1/1975 |
| 6,296,751 | B1 | 10/2001 | Mir | GB | 1448533 | 9/1976 |
| 6,303,037 | B1 | 10/2001 | Tamura et al. | JP | 54-5888 | 1/1979 |
| 6,309,532 | B1 | 10/2001 | Tran et al. | JP | 52-71015 | 10/1993 |
| 6,312,577 | B1 | 11/2001 | Ganzi et al. | JP | 07-155750 | 6/1995 |
| 6,375,812 | B1 | 4/2002 | Leonida | JP | 07-265865 | 10/1995 |
| 6,398,965 | B1 | 6/2002 | Arba et al. | JP | 09-253643 | 9/1997 |
| 6,402,916 | B1 | 6/2002 | Sampson et al. | JP | 2001-79358 | 3/2001 |
| 6,402,917 | B1 | 6/2002 | Emery et al. | JP | 2001-79553 | 3/2001 |
| 6,428,689 | B1 | 8/2002 | Kameyama et al. | JP | 2001-104960 | 4/2001 |
| 6,482,304 | B1 | 11/2002 | Emery et al. | JP | 2001-113137 | 4/2001 |
| 6,514,398 | B2 | 2/2003 | DiMascio et al. | JP | 2001-113279 | 4/2001 |
| 6,607,647 | B2 | 8/2003 | Wilkins et al. | JP | 2001-113280 | 4/2001 |
| 6,607,668 | B2 | 8/2003 | Rela | JP | 2001-121152 | 5/2001 |
| 6,627,073 | B2 | 9/2003 | Hirota et al. | JP | 2005007347 | 1/2005 |
| 6,645,383 | B1 | 11/2003 | Lee et al. | JP | 2005007348 | 1/2005 |
| 6,648,307 | B2 | 11/2003 | Nelson et al. | RO | 114 874 B | 8/1999 |
| 6,649,037 | B2 | 11/2003 | Liang et al. | WO | WO 92/11089 | 7/1992 |
| 6,766,812 | B1 | 7/2004 | Gadini | WO | WO 95/32052 | 11/1995 |
| 6,783,666 | B2 | 8/2004 | Takeda et al. | WO | WO 95/32791 | 12/1995 |
| 6,808,608 | B2 | 10/2004 | Srinivasan et al. | WO | WO 96/22162 | 7/1996 |
| 6,824,662 | B2 | 11/2004 | Liang et al. | WO | WO 97/25147 | 7/1997 |
| 2001/0003329 | A1 | 6/2001 | Sugaya et al. | WO | WO 97/46491 | 12/1997 |
| 2002/0092769 | A1 | 7/2002 | Garcia et al. | WO | WO 97/46492 | 12/1997 |
| 2002/0144954 | A1 | 10/2002 | Arba et al. | WO | WO 98/11987 | 3/1998 |
| 2003/0080467 | A1 | 5/2003 | Andrews et al. | WO | WO 98/17590 | 4/1998 |
| 2003/0089609 | A1 | 5/2003 | Liang et al. | WO | WO 98/20972 | 5/1998 |
| 2003/0098266 | A1 | 5/2003 | Shiue et al. | WO | WO 98/58727 A1 | 12/1998 |
| 2003/0106845 | A1 | 6/2003 | Bernard et al. | WO | WO 99/39810 | 8/1999 |
| 2003/0155243 | A1 | 8/2003 | Sferrazza | WO | WO 00/30749 | 6/2000 |
| 2003/0201235 | A1 | 10/2003 | Chidambaran et al. | WO | WO 00/64325 A2 | 11/2000 |
| 2004/0079700 | A1 | 4/2004 | Wood et al. | WO | WO 00/75082 A1 | 12/2000 |
| 2004/0089551 | A1 | 5/2004 | Liang et al. | WO | WO 01/49397 A1 | 7/2001 |
| 2005/0016932 | A1 | 1/2005 | Arba et al. | WO | WO 02/04357 A1 | 1/2002 |
| 2005/0103622 | A1 | 5/2005 | Jha et al. | WO | WO 02/14224 A1 | 2/2002 |
| 2005/0103630 | A1 | 5/2005 | Ganzi et al. | WO | WO 02/26629 A2 | 4/2002 |
| 2005/0103631 | A1 | 5/2005 | Freydina et al. | WO | WO 02/096807 A2 | 12/2002 |
| 2005/0103644 | A1 | 5/2005 | Wilkins et al. | WO | WO 03/033122 A2 | 4/2003 |
| 2005/0103717 | A1 | 5/2005 | Jha et al. | WO | WO 03/086590 A1 | 10/2003 |
| 2005/0103722 | A1 | 5/2005 | Freydina et al. | | | |
| 2005/0103723 | A1 | 5/2005 | Wilkins et al. | | | |
| 2005/0103724 | A1 | 5/2005 | Wilkins et al. | | | |
| 2005/0109703 | A1 | 5/2005 | Newenhizen | | | |

FOREIGN PATENT DOCUMENTS

| | | |
|---|---|---|
| CN | 1044411 A | 8/1990 |
| DE | 1 201 055 | 9/1965 |

OTHER PUBLICATIONS

Calay, J-C. et al., "The Use of EDI to Reduce the Ammonia Concentration in Steam Generators Blowdown on PWR Nuclear Power Plants", *PowerPlant Chemistry* 2(8):467 (2000).

DiMascio, F. et al., "Continuous Electrodeionization: Production of High-Purity Water without Regeneration Chemicals," The Electrochemical Society *Interface* Fall:26 (1998).

DiMascio, F. et al., "Electrodiaresis Polishing (An Electrochemical Deionization Process)", *Electrochemical Society PV*, vol. 94-19:164 (1994).

Farmer, J.C. et al., "Capacitive Deionization with Carbon Aerogel Electrodes: A New Approach to Water Purification and the Treatment of Hazardous and Radioactive Wastes," Strategic Environmental Research and Development Program SERDP Project No. 436-94.

Farmer, J.C. et al., "Capacitive Deionization of $NH_4ClO_4$ Solutions with Carbon Aerogel Electrodes," *Journal of Applied Electrochemistry*, 26:1007 (1996).

Ganzi, G.C. et al., "Electrodeionization: Theory and Practice of Continuous Electrodeionization," *Ultrapure Water®*, July/August:64 (1997).

Gittens, G. J. et al., "The Application of Electrodialysis to Demineralisation," *A.I.Ch.E.-I.Chem.E. Symposium Series* (London: Instn chem. Engrs) No. 9:79 (1965).

Glueckauf, E., "Electro-Deionisation Through a Packed Bed," *British Chemical Engineering*, December:646 (1959).

Jha, Anil D. et al., "CEDI: Selecting the Appropriate Configuration," *Power Engineering*, Aug. 2000.

Matejka, Z., "Continuous Production of High-Purity Water by Electro-deionisation," *J. Appl. Chem. Biotechnol.*, 21:117 (1971).

Shaposhnik, V.A. et al., "Demineralization of Water by Electrodialysis with Ion-Exchange Membranes, Grains and Nets," *Desalination*, 133:211 (2001).

USFILTER Product Literature, "H-Series Industrial CDI® Systems" (1998).

Yoram Oren et al., "Studies on polarity reversal with continuous deionization," *Desalination*, Elsevier Scientific Publishing Co., Amsterdam, NL, vol. 86, No. 2, Jun. 1, 1992, pp. 155-171.

ASTM, "Standard Practice for Calculation and Adjustment of the Langelier Saturation Index for Reverse Osmosis," Designation: D3739-94 (Reapproved 1998), pp. 1-4.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Nafion Products, Technical Information, "Safe Handling and Use," 1993, 4 pages.

FDA, "Guide to Inspections of High Purity Water Systems," printed from www.fda.gov. on Mar. 30, 2004, publication date unknown.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Purolite Technical Bulletin, Hypersol-Macronet™ Sorbent Resins, 1995.

R. Simons, "Strong Electric Field Effects on Proton Transfer Between Membrane-Bound Amines and Water," *Nature*, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting In Ion Exchange Membranes," Pergamon Press Ltd., 1983, 1984, pp. 275-282.

R. Simons, "The Origin and Elimination of Water Splitting in Ion Exchange Membranes During Water Demineralisation By Electrodialysis," *Desalination*, vol. 28, Jan. 29, 1979, pp. 41-42.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

Case Study, "Leading Bottled Water Company Relies on USFilter CDI® System to Meet Water Quality, Environmental and Safety Requirements," 2002, USFilter publication No. LO-BEV-CS-0502, 2 pages.

WATER TREATMENT SYSTEM

CROSS-REFERENCE TO RELATED APPLICATION

This application is a divisional application of U.S. patent application Ser. No. 10/856,264, entitled Water Treatment System and Process, filed on May 27, 2004, now U.S. Pat. No. 7,329,358 which is incorporated herein by reference in its entirety.

BACKGROUND OF THE INVENTION

1. Field of the Invention

The present invention relates to a water treatment system and process and, more particularly, to a water treatment system and process for producing purified water for human consumption.

2. Description of the Related Art

Purified water is used in many industries including the chemical, foodstuffs, electronics, power, medical and pharmaceutical industries, as well as for human consumption. Typically, prior to use in any one of these fields, the water is treated to reduce the level of contaminants to acceptable levels. These treatment techniques include disinfection, distillation, filtration, ion exchange, reverse osmosis, photooxidation, ozonation, and combinations thereof.

Various levels of purity may be required for different end uses. Water quality may be regulated by various government agencies and trade organizations including the U.S. Environmental Protection Agency (EPA) and the Food and Drug Administration (FDA).

The beverage industry consumes a significant amount of water that must meet environmental, as well as health requirements. In addition to regulations that assure that beverages are safe for consumption, the beverage industry faces additional standards that are grounded in quality control. For example, a water supply that meets federal regulations for microorganisms may not satisfy a beverage producer's quality control standards for additional parameters such as taste and odor that may affect product quality. These standards may include hardness (calcium, magnesium and silica content), bicarbonate, pH, total suspended solids (TSS), total dissolved solids (TDS), color, taste, and temperature.

Control of these parameters is complicated by the decentralized structure of the beverage industry itself. For instance, a world-wide producer of beverages typically has a number of points of production throughout the world. Each of these points may access a water supply that is different than those used by other plants. Although federal regulations may help to standardize health and safety requirements for water used in beverage production in the United States, these standards may differ greatly from those in other countries. These different standards may impact factors such as taste, odor, and appearance. This may be important to producers who market a beverage under a single trademark throughout a large territory. For example, a customer who consumes a beverage in one part of the country will expect the same appearance and taste from that beverage regardless of where it is purchased. To assure this type of consistency, the beverage producer may require that the water used in beverage production meet the same, or similar standards, regardless of where the beverage is produced. One way of achieving this goal is through the use of water treatment processes.

Assuring water quality for a number of bottling plants typically requires the imposition of measurable and attainable water quality standards that can be achieved at minimal cost for various types of feed water that may be used. These quality control issues become even more difficult to implement and control when fountain outlets are included. Fountain outlets are typically those locations where beverages are produced for immediate on-site, or nearby, consumption. Generally, at a fountain outlet, water is mixed with a flavor syrup and, in the case of carbonated beverages, carbon dioxide. The beverage may then be served directly to the consumer. Among the advantages provided by fountain outlets are the savings realized from not shipping or storing a bulky product. Because of these and other advantages, millions of licensed fountain outlets are in operation worldwide.

Consumers typically expect consistent quality in their beverages whether they choose to purchase a can or bottle from a store, or a cup from a fountain outlet. As water quality can affect the taste and appearance of a beverage, it is important for beverage licensors to provide water quality standards for fountain outlets as well as for bottlers. There are several factors that may influence water quality standards for fountain outlets, two of which are available sources of water and the cost of treating the water.

As fountain outlets may exist in various locations, the water sources used to produce fountain beverages may also differ. These water sources may include, for example, municipal water supplies, surface water, well water, precipitated water and desalinated sea water. Each of these sources may supply water of varying quality, and even within one type of water supply, for instance, well water, the type and quality of the water supplied may not be consistent from location to location.

Additionally, fountain outlets are commonly found at restaurants, snack bars, convenience stores, and the like, and at many of these locations the cost of water treatment may have an impact on profitability. Thus, beverage producers and licensors must balance the needs of the consumer for consistent taste and appearance with the outlet's need for a low-cost water supply. In addition, the outlet operator is concerned with reliability; if the water treatment system fails, beverage production at a fountain outlet comes to a halt. System maintenance is also important and typically the goal is for less frequent maintenance with less complicated procedures.

The capacity of the water treatment system is also different from that required by a bottler. Typically, the output requirements are much lower at fountain outlets, yet the system must still be able to produce an adequate supply of high quality water at times of peak demand, and since fountain outlets may go through periods of non-use, a water treatment system should be able to supply high quality water on demand after a period of non-use.

Different well water sources may provide a challenge for those designing water treatment systems for fountain outlets. Well water may contain high concentrations of dissolved matter, such as bicarbonate and dissolved solids, as well as suspended material that may contribute to taste and appearance. For example, water may be hard, having a high concentration of calcium, magnesium or silica and may contain additional ionic materials contributing to total dissolved solids (TDS). In addition, organic materials, as well as dissolved gases, may be present, pH and buffering capacity may vary widely, and the composition of the water from a single well may vary over time or with different levels of use.

Various water treatment systems and processes exist for producing high purity water for use in beverage production and other industries. Among these systems are disinfection units, such as chlorinators and ozonators, filters, water softeners, reverse osmosis systems, and chemical ion exchange devices.

Disinfection units are typically used to reduce the concentration of viable microorganisms in a water supply. This may be accomplished by adding a disinfectant, for example, chlorine, ozone, or ammonia, directly to the water supply so that pathogenic organisms are destroyed. Alternatively, microorganisms may be destroyed by a process, such as heating or treatment with ultraviolet light, or microorganisms may be physically removed from the water by filtration. When a chemical disinfectant is used, it is often desirable to remove the disinfectant from the water prior to consumption, and this may be accomplished in a number of ways including chemical neutralization and removal by filtration.

Filtration is used to remove suspended matter from a water supply but may also aid in the removal of dissolved or colloidal species. Filters may be structured from a variety of materials including particulate matter such as sand, diatomaceous earth, or granular activated carbon (GAC), or may be based on a membrane that may be composed of a number of different materials including polymers and fibrous materials. Filters typically work by preventing the passage of suspended material while allowing water to pass through. One way of rating a filter is by its "pore size" which provides information as to what size particle will be retained by the filter. Some methods, such as hyperfiltration, may have pore sizes small enough to exclude some dissolved species.

Water may be adversely affected by the presence of calcium or magnesium ions. Known as "hardness," a high concentration of these cations, typically more than 200 ppm (mg/L as $CaCO_3$), results in a water that may leave scale or other deposits on equipment and piping. Typically, calcium and magnesium are removed from water (softened) by exchanging the calcium and magnesium ions for alternative cations, often sodium. Water softeners typically contain resin beads that exchange two sodium ions for every calcium or magnesium ion that is removed from the treated water. Periodically, the water softener may be recharged to resupply the resin beads with an adequate supply of sodium or alternative cations.

Reverse osmosis (RO) is a filtration technique that provides for the removal of dissolved species from a water supply. Typically, water is supplied to one side of an RO membrane at elevated pressure and purified water is collected from the low pressure side of the membrane. The RO membrane is structured so that water may pass through the membrane while other compounds, for example, dissolved ionic species, are retained on the high pressure side. Some species however, such as bicarbonate, may not be retained. The "concentrate" that contains an elevated concentration of ionic species may then be discharged or recycled, while the permeate, typically containing a reduced concentration of ionic species, is collected for later use.

Figure 1:
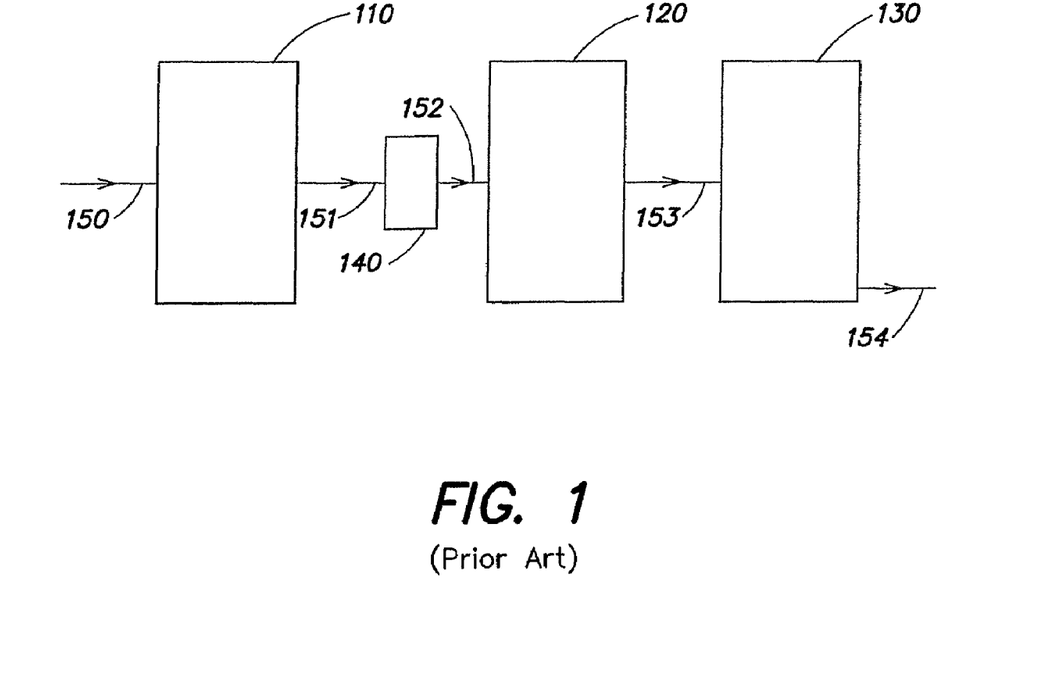
FIG. 1 is a schematic drawing of a prior art water treatment system.

A system currently used to purify water for use in beverage production systems is illustrated in FIG. 1. Feed water passes through conduit 150 into particulate filter 110 which helps to remove any particulate matter that may be suspended in the feed water. The water then passes through conduit 151 into pump 140. Pump 140 pressurizes the water which proceeds through conduit 152 into RO device 120. In RO device 120, purified water is collected from the low pressure side of the membrane and passes through conduit 153 to storage tank 130. When an adequate supply of purified water is contained in storage type 130, it may be drawn to a beverage production system through a pump (not shown) connected to conduit 154.

Deionization units may also be used to remove a variety of ionic species from a water supply. Deionization units typically employ either chemical or electrical deionization to replace specific cations and anions with alternative ions. In chemical deionization, an ion exchange resin is employed to replace ions contained in the feed water. The ions on the resin are recharged by periodically passing a recharging fluid through the resin bed. This fluid may be an acid that replenishes the supply of hydrogen ions on the cation exchange resin. For anion exchange resins, the resin may be replenished by passing a base through the resin, replacing any bound anions with hydroxyl groups and preparing the resin for additional anion removal.

In electrodeionization, however, the resin or resins may be replenished by hydrogen and hydroxyl ions that are produced from the splitting of water during the application of electric current to the deionization unit. In continuous electrodeionization (CEDI), the ions are replaced while the feed water is being treated, and thus no separate recharging step is required. Typically, the feed water is first passed through an RO membrane to reduce the total concentration of ionic species present in the feed water. This reduces the load on the CEDI unit and prevents scale and deposits from building up in the concentrating compartment of the unit.

SUMMARY OF THE INVENTION

In one aspect a method of purifying water is provided, the method including providing a feed water, reducing a hardness of the water to a range of 5-100 ppm as $CaCO_3$, reducing an alkalinity of the water to a range of 10-100 ppm as $CaCO_3$, and supplying the water of reduced alkalinity and reduced hardness for human consumption.

In another aspect, a water treatment system is provided, the water treatment system including a feed water inlet, an electrochemical deionization device in fluid communication with the feed water inlet and comprising a treated water outlet, and a beverage production device in fluid communication with the treated water outlet.

In another aspect, a method for purifying water for beverage production is provided, the method comprising the steps of supplying feed water to an electrochemical deionization device to produce a purified water stream, and feeding the purified water stream to a fountain beverage production device.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

The present invention is directed to a water treatment system and process for effectively treating water for human consumption. The invention may be used with a variety of feed waters to produce a consistent, high quality water supply to meet the requirements of the food and beverage industry. In various embodiments, purified water may be used, for example, in cooking, drinking, hot and cold beverage production, brewing, washing and/or ice making.

Beverage producers may have specific requirements for which the invention may be particularly well suited. For example, fountain beverage producers may access water supplies that differ greatly from those used by other producers, yet the production water specifications required by beverage companies may be precise, or at least within a specific range, from one point of production to the next. Thus, one producer using a municipal surface water supply as a source may be required to reduce levels of chlorine while another producer accessing its own well may be required to reduce levels of bicarbonate and calcium. In one aspect, the present invention may be applicable to a large cross-section of these producers because of its versatility in producing a consistent supply of treated water from a variety of sources.

In one aspect, the present invention may be used to provide purified water to a beverage production device. A beverage production device is any device that uses water to produce a beverage for human consumption. The beverage production device may be used to produce carbonated or non-carbonated beverages and may also provide purified drinking water. Some beverage production devices provide a beverage by adding a syrup concentrate to water and, if carbonated, carbon dioxide. Fountain beverage production devices are those that produce beverages for immediate consumption on site, or nearby, rather than for storage or shipment. Fountain beverages are typically produced using chilled water but are not refrigerated after production. Fountain beverage devices are often found in restaurants, snack bars, gas stations and convenience stores. In some cases, they may be portable.

In another aspect, an electrochemical deionization device may be used to produce purified water. An electrochemical deionization device can be any device that employs an electric current or electric field to reduce the concentration of ionic compounds in a water sample. Some electrochemical deionization devices of the invention have no moving parts and/or have no filtration membrane. Examples of electrochemical deionization devices include electrodialysis (ED), electrodialysis reversal (EDR) electrodeionization (EDI), capacitive deionization, continuous electrodeionization (CEDI), and reversible continuous electrodeionization (RCEDI).

Electrochemical deionization devices, methods of use, and methods of making are described by, for example, Giuffrida et al. in U.S. Pat. Nos. 4,632,745, 4,925,541, 4,956,071 and 5,211,823, by Ganzi in U.S. Pat. No. 5,259,936, by Ganzi et al., in U.S. Pat. No. 5,316,637, by Oren et al. in U.S. Pat. No. 5,154,809, by Kedem in U.S. Pat. No. 5,240,579, by Liang et al. in U.S. patent application Ser. No. 09/954,986 and U.S. Pat. No. 6,649,037, by Andelman in U.S. Pat. No. 5,192,432, Martin et. al. in U.S. Pat. No. 5,415,786, and by Farmer in U.S. Pat. No. 5,425,858. All patents and patent applications cited herein are hereby incorporated by reference herein.

Water treatment systems to purify water for beverage production, such as at fountain beverage outlets, have traditionally been designed using a variety of devices that may be included or excluded based on factors such as the type of water supply, the location, and the anticipated water demand. For example, a site using well water might include a chemical ion exchange water softener while a site using a municipal water supply might use a reverse osmosis (RO) device, a storage tank, and a pump. In one aspect, the present invention provides for a system based on one or more electrochemical deionization devices to produce consistent quality purified water. The system can be installed at different locations accessing different types of supply waters. An electrochemical deionization device, such as a CEDI or RCEDI, may be "tuned" to provide a water that contains neither too many nor too few impurities for beverage production. For example, if a feed water contains a high level of hardness and TDS, process conditions for the device may be altered to remove a greater amount of impurities. If a feed water contains lower levels of impurities, the device may be tuned to remove fewer contaminants to avoid producing a water that is too pure. The device may either be tuned manually by an operator, or automatically, in response to a change in a condition, such as product water conductivity or demand rate. Thus, changes in the system such as rate of demand, device efficiency, or feed water quality may be automatically compensated for by tuning. The device may require little or no maintenance as many changes in efficiency may be compensated for by tuning rather than by replacing components, for example. The tuning may be transparent to the operator.

In one embodiment, the device may be dedicated to supplying water only for beverage production and the product output of the device may be plumbed exclusively to a beverage production system, such as a fountain outlet. In such a case, an electrochemical deionization device is in exclusive fluid communication with a beverage production device. In other embodiments, product water may be used for other purposes, such as, for example, food preparation, drinking water, and dish washing.

Typically, RO systems require a significant amount of storage because while they may be efficient at removing some dissolved matter from a water supply, these systems may not be able to adequately provide the required flow on demand, but rather are configured to gather treated water in a storage device from which it can be drawn when needed. Thus, the present invention may provide a number of advantages over traditional RO based systems. Electrochemical deionization systems may provide constant or on demand flow rates of greater than 1, 2, 3, 5 or 10 gal/min. For some embodiments, such as those used with fountain beverage dispensers, an electrochemical deionization device may have production capacities of less than 20, less than 10 or less than 5 gal/min. Smaller capacity systems may be sized most appropriately for use in restaurants, concessions stands, convenience stores, and the like. Systems of these capacities may be sized to fit in a footprint area of about 9 ft$^2$ and may be used in many fountain outlets without requiring the building of additional space for installation of a water treatment system.

Ease of use and economy of operation may be important to a fountain beverage operator. Typically, fountain operators are not trained in water treatment and prefer systems that run themselves without constant monitoring or input from the operator. The system of the present invention may be well suited for this environment because it may be self-monitoring and may be able to supply on-demand water 24 hours a day without a requirement of pre-testing the quality of the water. In addition, when maintenance is required, it is preferred that the procedures be simple and routine. For example, the system may use GAC cartridges and particulate filter cartridges that can be switched out at pre-set intervals or when certain parameters, for instance, water quality, reach certain levels.

An electrochemical deionization device may be partially or totally maintenance-free. For example, in an RCEDI system any scale build-up may be halted or reversed by switching the polarity of the system. Resin may be recharged by in situ hydrolysis within a compartment or at an interface with a membrane. A temporary or permanent decrease or increase in efficiency may be compensated for by a change in process conditions, which may occur automatically. A change in process conditions may include a change in voltage or current or a change in flow rates through depletion, concentrating, or electrode compartments, or any combination thereof.

As described in U.S. Pat. No. 4,956,071, a reversible continuous electrodeionization (RCEDI) device is a CEDI device that is configured to periodically reverse the polarity of the electrodes. Dilution and concentration compartments may also alternate functions. In some embodiments, an RCEDI device that may be used with the present invention can be operated with little or no maintenance. Furthermore, if an RCEDI device fails, it typically does so slowly, giving the operator the opportunity to have the device serviced while still producing acceptable quality water. Alternatively, if an RO system fails, it may happen instantaneously, resulting in the inability to produce purified water until it is repaired. An RCEDI device may be operated by a manual or automatic controller that can adjust process conditions in response to, for example, feed water or product water quality.

In one aspect, a system of the present invention may have lower power requirements than do alternative systems. For example, while RO and chemical deionization systems typically require additional pumps to achieve the pressures necessary for proper operation, the present invention may be capable of producing acceptable quality water at tap pressures, and may be capable of operating at feed pressures below about 20 psig. In some embodiments, no pumps are used and the only pressure required is provided by the tap pressure. A system may be designed using readily available power supplies, eliminating the need for expensive wiring options.

Space requirements may also be important, particularly for fountain beverage producers. By optionally providing for the elimination of such bulky components as, for example, pumps, storage tanks, and power supplies, the system may be installed in a relatively small area, possibly without requiring the relocation of production equipment that is already in place. In addition, by eliminating additional pumps, for example, the system may provide significantly quieter operation than alternative systems such as RO or ion exchange and therefore may be particularly appropriate at sites where noise may be a concern.

The disposal of brines and concentrates may also be significantly reduced. Typically, water softeners and chemical deionization devices, among others, require periodic recharging that can result in significant generation of waste water that may have low pH levels or contain high levels of salts. Disposal of waste water may trigger additional regulatory requirements that the user must meet. This may be of greater concern in areas where regulations prohibit or regulate the discharge of brines and other recharging fluids to a local septic system or other waste water disposal facility. The present system, by replacing such devices with an electrochemical deionization device, may greatly reduce the amount of these fluids that are discharged to waste. In some embodiments, there may be no net increase to the total dissolved solids that are received in the tap water.

Water use may be minimized by implementing one or more aspects of the present invention. The system of the present invention may be more efficient in its use of water than alternative systems, such as RO. For example, the system of the present invention may operate so that a recovery of greater than about 55, 60, 65, 70 or 75% of the feed water is obtainable. This compares favorably to the 50-55% recovery that is typically obtainable from a two-pass RO system producing comparable quality water. In addition, upon start-up, the present invention may produce water that is immediately available for beverage production. Alternative systems may require that an initial quantity of water be discharged before the supply is of sufficient quality to be used. For example, after recharge, a chemical deionization system may produce water at a pH of about 3 for a period of time. Water at this pH may not be suitable for beverage production and may therefore require discharge to waste. Furthermore, the output of the present system may be adjusted over a range of about 50-150% of the designed output and still produce acceptable quality water. This means that feed water need not be wasted in producing water of greater purity than is required for a specific application. Alternatively, if water quality needs to be raised, similar adjustments to process conditions may be made to achieve the desired results. Adjustments may be made manually or automatically by a controller.

Figure 2:
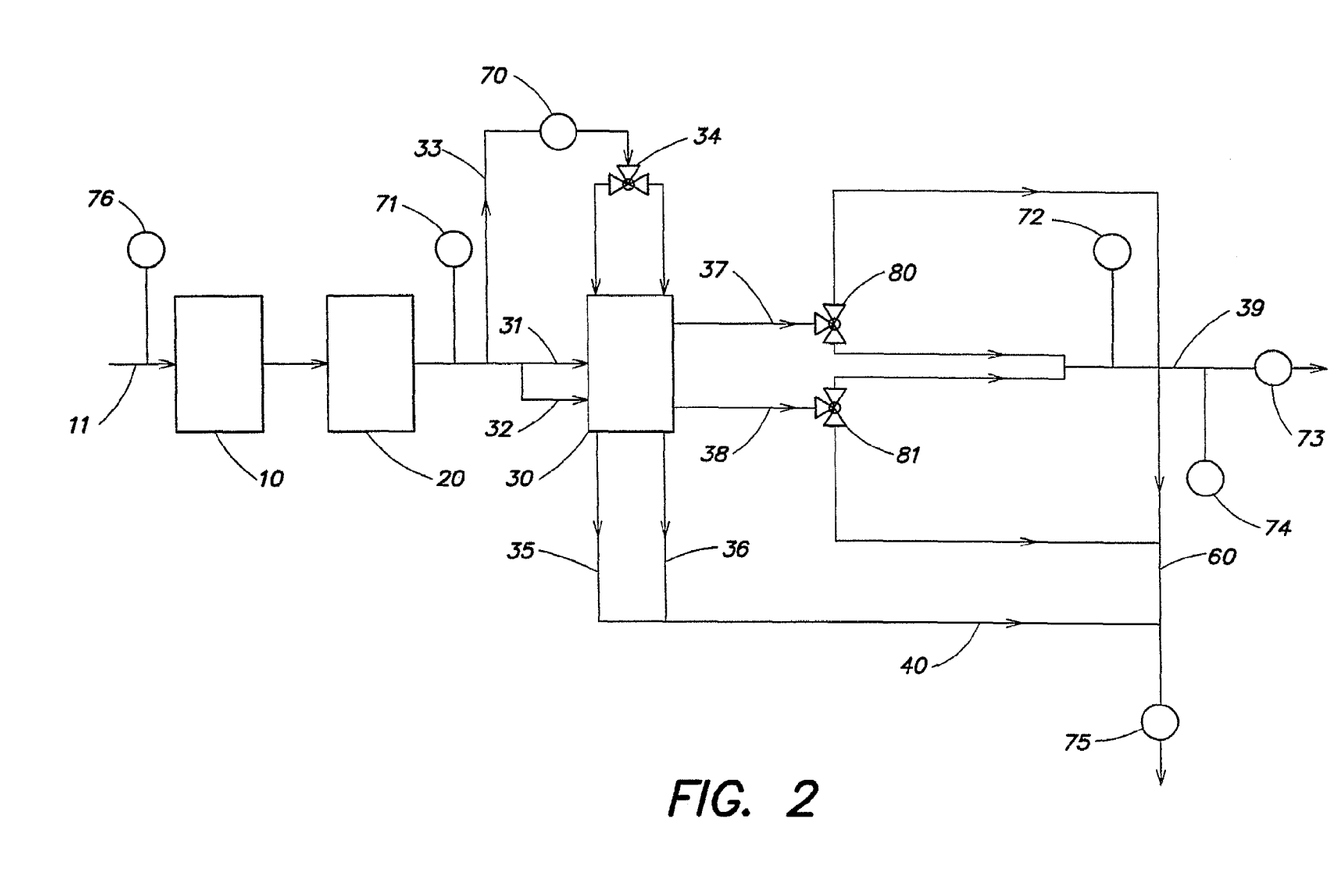
FIG. 2 is a schematic drawing of an embodiment of the apparatus of the invention.

One embodiment of the invention is shown in FIG. 2. Prior to entering the system through conduit 11, feed water may first be pretreated in any number of ways. "Pretreatment" means that water quality is altered prior to entering an electrochemical device. Pretreatment may include adding or removing substances from the water, or altering a quality of the water. For example, water may be disinfected through the use of chemical or physical techniques. Chemical disinfection typically includes the addition of an oxidant to the water supply. These oxidants may include chlorine, chloramine, ozone, or ammonia. If water is to be disinfected through non-chemical techniques, it may be heated for a length of time at a temperature that is adequate to destroy microorganisms. Alternatively, the water may be disinfected with radiation such as ultraviolet light or may be disinfected by filtering out microorganisms of concern.

Aeration may also supply some benefits as a pretreatment step. Aeration involves bubbling a quantity of air (or other gas) through the water supply to facilitate chemical reactions or to physically remove compounds from the water. For example, aeration may help in removing residual disinfectants such as chlorine and chloramine. In addition, aeration may aid in removing volatile and semi-volatile organic compounds, including trihalomethanes (THMs), that may be present in the water. Aeration may also reduce the concentration of hydrogen sulfide ($H_2S$) and radon in the feed water as well as serve to oxidize organics and/or metals such as iron. The oxidation of iron in solution may result in the formation of a precipitate, such as iron oxide, that may be easier to separate from the feed water than dissolved iron. It may be preferred that feed water containing relatively high concentrations of iron is pretreated to remove the iron from solution as it may contribute to taste and odor in a beverage.

Another pretreatment technique that may be used is treating with a flocculent. The addition of a flocculent, for example, alum, may help in coagulating suspended particles so that they are more easily separated from the feed water. This may result in a decrease in the particulates that need to be filtered out in the particulate filter of the invention, and thus may result in prolonging the life of the filter. The use of a flocculent may be combined with aeration.

In one aspect, the invention provides a water that is less pure than water that may be produced by other purification methods. Often, a beverage producer may prefer a water that is pure, but not too pure. For example, if a water contains very low levels of TDS, for example, less than about 50 ppm, less than about 20 ppm, or less than about 10 ppm, the water may negatively affect the taste of the beverage. In addition, other characteristics such as corrossivity may be affected by excessively pure water. Therefore, some water purification techniques, for example, RO, may provide a water that is more pure than is typically desirable for beverage production devices.

One way of providing a water containing enough TDS and alkalinity to meet taste requirements is to blend a pure water (that would be too pure by itself) with a feed water or other water containing high levels of alkalinity and TDS. A proper blending ratio may result in a water having adequate taste characteristics. Of course, this may involve additional steps, valves, pumps, etc. Minerals or other soluble species may also be added (or added back) to a pure water. In some embodiments, beverage quality water may be produced without adding substances to a purified water.

In another aspect, purified water may be produced, for human consumption, for example, without blending a purified water with a less pure water to obtain a desired range of dissolved species, such as, for example, minerals, salts, hardness, alkalinity, $CO_2$ or TDS. In some embodiments, one or more impurities in a feed water are reduced to a desirable level without mixing waters of high and low impurity concentration. The levels of impurities, such as, for example, hardness, TDS and alkalinity may be reduced to desired levels in a single step using a single device, such as an electrochemical deionization device. The water need not first be purified to a level below a desired range and does not need to be blended with a water containing impurities in a higher range, as may be done, for example, with some RO systems. The system may be operated without purifying any of the water to a level below that of a target level for one or more impurities. Using electrochemical deionization, target ranges can be reached directly by adjusting the operating conditions of the electrochemical deionization device.

In some embodiments, an electrochemical deionization device can be controlled and adjusted for water quality. The option of controlling and adjusting product water quality can expand the types and quality of feed water that can be used to make purified water of a consistent, predetermined quality that may be suitable for beverage production. Process conditions such as voltage, amperage, flow rate and reversal cycle timing may be altered manually or automatically, and may be done in response to, for example, purified water quality, concentrate water quality, or feed water quality. Process conditions may also be adjusted due to changes in factors unrelated to water quality, such as temperature and demand rate. Altering a process condition may include altering the removal efficiency of the device. For example, if a level of TDS is detected that is too low, the efficiency of the device may be reduced so that fewer impurities are removed from the water. This may be done, for example, by reducing the current to a CEDI or RCEDI device. Likewise, if TDS levels are above a desired range, the efficiency of the device may be increased by increasing the current or reducing flow. In other embodiments, efficiency may be varied by turning on and off (cycling) the electrical feed to the electrochemical deionization device at various intervals. For example, current may be applied for 90% of the time and turned off for 10% of the time while maintaining a constant fluid flow through the device. This may result in purified water having about 90% of impurities removed compared to water produced when the device is operated with current applied 100% of the time. Any cycling may be done over short time periods to avoid possible variations in product water quality that might result from extended periods of no applied current. For example, cycling may occur less than every minute or less than every 10 seconds.

An electrochemical deionization device may be heat sanitizable. If an electrochemical deionization device is heat sanitizable, the surfaces of the device that are usually in contact with water during treatment may be raised to a temperature and for a length of time adequate to kill or prevent the reproduction of pathogenic micro-organisms. For example, the temperature may be raised to greater than 50, 60, 70, 80, 85 or 90 degrees Celsius. The device may be exposed to an elevated temperature for a period of time greater than 10 minutes, 30 minutes or 1 hour. Examples of electrochemical deionization devices that are heat sanitizable and methods of using them are provided in Arba, et al., "Electrodeionization device and methods of use," U.S. patent application Ser. No. 09/954,986, Publication No. 20020144954, which is hereby incorporated by reference in its entirety herein.

In one embodiment, the electric current across a CEDI or RCEDI device can be adjusted to reduce or increase the amount of ionic material that is removed from feed water. In many cases, no blending is required. In another embodiment, if a quality level for purified water is set, then one or more process conditions can be adjusted in response to changes in feed water quality or to changes in the efficiency or performance of the system. This type of adjustment may also be employed when a similar design is to be used at different installations having various feed waters. For example, an electrochemical deionization device may be versatile enough to be used at locations providing feed waters from municipal sources or from well sources having either soft or hard water supplies. A controller, such as a PLC, to adjust the operation of the electrochemical deionization device may be included with the system and may be sensitive to a number of factors, such as product water quality, water flow, feed water temperature, product water temperature, feed water quality and operator input. Thus, a feedback control system may be implemented to provide a consistent quality purified water responding to changes in, for example, desired purified water quality, feed water quality, temperature, use rates, and condition of the device and related equipment. Acceptable ranges for characteristics such as conductivity, hardness, alkalinity and TDS may be maintained with a single device independent of changes to demand, feed water quality, temperature, and device efficiency, for example.

In some beverage applications, it may be preferred to reduce water storage. Systems based on RO devices typically require downstream storage to meet demand due, in part, to typically slow production rates of the RO device. Any stored water may provide an environment for microorganisms to grow, and rather than require additional disinfection and monitoring, it may, in some cases, be more efficient to avoid storage all together. Thus, an "on demand" type system such as provided in one embodiment of the present invention, may be ideal for use with a fountain beverage production device or with any application that benefits from reduction of water storage, for example, beverage (including water) vending machines, coffee makers, dish washers, and rinse water for car washing facilities. An on demand system is one that can purify water for immediate use, for example, to be used less than one minute after it is purified. An on demand system typically has no storage tank between the water purification device and the point of use, e.g., the fountain beverage device. While there may be some piping or tubing between the water purification device and the point of use, the total volume of this piping or tubing is typically less than about one liter. In some embodiments, there need not be a pump downstream of the water purification device. An on demand system may also provide water suitable for beverage production immediately after a term of non-use, for example, after an overnight period. The system may not need to be rinsed prior to using the water.

As shown in FIG. 2, the system of the invention may include a number of optional components, such as a carbon filter 10. The carbon filter may be first in a series of treatment devices. The pressure of the feed water being supplied to carbon filter 10 may be monitored by pressure gauge 76. Carbon filter 10 may aid in the removal of any number of contaminants, including organic compounds as well as residual disinfectants such as chlorine and chloramine. Any type of carbon filter may be used, including cartridge types that may be preferable in a beverage production location because the cartridge can be quickly and easily changed out when its removal efficiency drops. Alternatively, a cartridge may be replaced simply based on time in service or on total volume throughput. Typically, beverage production sites are not equipped to regenerate carbon, making replaceable cartridges even more attractive. Other types of carbon filters that may be used include carbon block filters and granulated activated carbon (GAC). Multiple carbon filters of different types may be used in parallel or in series. For example, a carbon block filter may be used in series with a filter containing GAC. Preferably, carbon filter 10 includes GAC that may be particularly suitable for use in the beverage industry because of its ability to remove taste and odor compounds from a water supply. It is preferred that carbon filter 10 is sized to minimize the pressure drop and flow restriction across the filter and to reduce the frequency with which it must be replaced while balancing these attributes against cost and size considerations. More preferably, the filter may contain additives such as zeolites to aid in the removal of any heavy metals or other contaminants that may not be efficiently removed by carbon alone.

After the feed water passes through the carbon filter it may be fed to another pretreatment device such as particulate filter 20. Particulate filter 20 may be any filter capable of removing particulate matter from the feed water. Such filters include, for example, depth, screen, surface filters, and microporous filters. The filter media used may be a depth type filter such as a bed of greensand or diatomaceous earth or a string wound cartridge of cotton, polypropylene or other polymer. Alternatively, particulate filter 20 may be, for example, a microfiltration or ultrafiltration membrane. The membrane may be hydrophobic or hydrophilic and may be composed of, for example, PVDF, PTFE, polypropylene, polyethersulfone or polyethylene. The particulate filter that is chosen may be selected based on the type of feed water at the installed location. For example, if the feed water typically contains large amounts of suspended matter, a depth filter with a high loading capacity may be used. If the water is from a source that has not been treated to destroy microorganisms, a filter capable of removing microorganisms of concern, such as an ultrafiltration device, may be chosen.

Preferably, particulate filter 20 is a depth filter. More preferably, particulate filter 20 is a cartridge filter, and most preferably, it is a cartridge filter having filtration media composed of fibrous material such as cotton or polypropylene with all parts that contact the water being of food grade material. Cartridge filters provide for easy replacement that can be performed by untrained personnel, thus minimizing the need for service calls at the installation. In addition, a variety of different cartridge types may be used with a single cartridge housing unit, thus minimizing the need for offering different housing types with the water treatment system.

After the feed water has passed through particulate filter 20, it may then be fed to an electrochemical deionization device, such as an RCEDI unit 30. An RCEDI is a continuous electrodeionization device that is configured to reverse polarity of the electrodes and alternate concentrating and depleting compartments at about the time that the polarity reversal takes place. The operation of such a device is described in Giuffrida et al., U.S. Pat. No. 4,956,071. Such a device may contain a series of depleting and concentrating compartments typically bounded by either anion-permeable or cation-permeable membranes. Each type of compartment may contain an ion exchange resin, typically a mixed-bed resin having both anion and cation exchange resins. Ion exchange resins may also be homogeneous or doped and may be in layers. At least one cathode and at least one anode are provided that supply an electric current that splits water molecules into hydrogen ions and hydroxide ions that constantly replenish the ion exchange resin contained in the depleting compartments. As water passes through the depletion compartment, cations are exchanged for hydrogen ions with the cations being drawn through a cation permeable membrane into a concentrating compartment under the influence of an applied electric field. Likewise, anions are exchanged for hydroxyl ions and pass through an anion permeable membrane into a concentrating compartment. De-ionized water then exits the depletion compartment and may be fed to another depletion compartment for further purification or may be discharged for use or alternative treatment. Water exiting the concentrating compartment may pass through additional concentrating compartments to be further concentrated or may be discharged to waste or an alternative use.

At a time either predetermined or determined later, for instance, by an operator or a controller, the polarity of the RCEDI system 30 may be reversed so that the cathode(s) becomes the anode(s) and vice versa. For example, polarity may be switched at 10 minute intervals. At this time, or about this time, concentrating compartments become depleting compartments and depleting compartments become concentrating compartments. Soon, the water exiting the new depleting compartments may be purer than that exiting the new concentrating compartments. By alternating compartments in this manner, scale and deposit build-up may be minimized as no one compartment serves as a concentrating compartment for an extended length of time. Thus, the resins, compartments, membranes, valving and piping may not be subjected to a level of solids build-up that may occur in a system that does not use polarity reversal. In addition, the resin lifetime may be increased and the quality of the production water can be improved.

Cathodes and anodes used in an electrochemical deionization device may be of the same material. These electrodes may have a base of, for example, titanium, niobium or tantalum with a coating of platinum, ruthenium, iridium, or other dimensionally stable anode material. It is preferred that a coating, when used, has a thickness from about 150 to about 200 micro inches. This coating thickness, in some cases, corresponds to about 25 grams per square meter.

In some embodiments, a chiller may be placed in series with an electrochemical deionization device. The chiller may be upstream of the device or downstream of the electrochemical deionization device and may be upstream of a fountain beverage production device. When a chiller is placed upstream of the electrochemical deionization device, a reduction in scale build-up may be realized.

In the embodiment shown schematically in FIG. 2, after feed water passes through particulate filter 20, it enters conduits 31 and 32 as well as conduit 33. Feed water flow and pressure may be measured at flow meter 70 and pressure gauge 71. Conduits 31 and 32 can provide water to the concentrating and depleting compartments (not shown) of the RCEDI stack. When conduit 31 is supplying feed water to the depleting compartments, conduit 32 is supplying feed water to the concentrating compartments. When the polarity is reversed, conduit 31 supplies the concentrating compartments and conduit 32 supplies the depleting compartments. Purified water, the water that exits the depleting compartment (or the concentrating compartment immediately after polarity reversal), is fed to either conduit 37 or conduit 38, depending upon which set of compartments is currently acting as the depleting one. The alternate conduit (either 37 or 38) that is carrying water from the concentrating compartments is shuttled to waste line 60 or is recycled. The pathway of each of conduits 37 and 38 is controlled by either valve 80 or valve 81. The valves may be configured so that only one of either conduit 37 or 38 is permitted to feed water to production conduit 39. Thus, if conduit 37 is feeding production conduit 39, then conduit 38 will be directed to waste line 60. Pressure and flow of production water may be monitored with pressure gauge 72 and flow meter 73. Water quality may also be measured by a number of methods including optical, chemical and electrical measurement devices. In some embodiments, a conductivity meter 74 may be used, as it is a reliable way to monitor the ionic content of the water.

Conduit 33 may provide water, in series, to the anode and cathode compartments (not shown) and when polarity is switched, valve 34 may be activated so that water flow through these compartments is reversed. Water exiting the cathode and anode compartments passes through either discharge conduit 35 or discharge conduit 36, both of which join to form conduit 40 that leads to either waste line 60 or is recycled. Flow in the discharge conduits may be measured by flow meter 75.

Unlike conventional water softening techniques that use chemical ion exchange to remove calcium, magnesium and silica from feed water, the system of the present invention may provide for the removal of these ions without substituting sodium, potassium, or other cations in place of the cations that are being removed. Calcium, magnesium and/or silica may be replaced by, or exchanged for, hydrogen ions. Hardness can be removed to levels that provide a water that is not so soft that taste is noticeably affected.

Some water softening and water purification techniques may result in a water so pure that it may be corrosive, may be of reduced or elevated pH, or may lack dissolved species that provide a taste component. Beverage vendors and licensors may be particularly concerned with the taste of any water used to produce a beverage which may be sold under a trademark and, therefore, must be carefully quality controlled. This may be particularly important at fountain outlets because of the large number of outlets, as well as the variation in water supplies that may be used. For example, an RO system that might provide acceptable feed water for fountain beverages at one outlet may actually provide water of too great a purity when installed at another outlet. Furthermore, due to the nature of the operation of RO membranes, the purity of the output cannot be varied. Embodiments of the invention that take advantage of the process control capabilities of electrochemical deionization devices allow the output of the water to be controlled over a relatively narrow range that contains neither too much nor too little TDS, hardness, alkalinity and other constituents. For example, hardness may be controlled to a range of between 5 and 100 ppm (mg/L), between 10 and 100 ppm, between 20 and 80 ppm, or between 30 and 70 ppm, measured as calcium carbonate. Likewise, alkalinity may be controlled to be in a range of between 10 and 100 ppm, between 20 and 80 ppm, and between 30 and 60 ppm, measured as calcium carbonate. In addition, the electrochemical deionization device, such as an RCEDI, can be controlled to maintain pure water quality levels within a range of plus or minus 10 ppm, plus or minus 20 ppm, or plus or minus 30 ppm. In addition, these ranges may be maintained for a range of feed waters including municipal water and well water. In some embodiments, quality of water from a fountain outlet may be controlled within a range allowing a fountain to sell not only flavored beverages, but to sell branded water as well. This may be done, in some cases, without adding minerals or other species to a purified water. This may not be possible with other systems because without flavoring and carbonation to help mask slight variations in water flavor, a water available from a fountain outlet may not be of consistently adequate quality to be sold under a trademark.

Bicarbonate can be an important component of water that is used to prepare beverages. For example, too much bicarbonate in solution can consume added carbon dioxide resulting in a flat carbonated beverage. If too little bicarbonate is in solution, other characteristics such as pH may be affected. For example, if bicarbonate levels are too low, the buffering capacity of the water may be reduced and the addition of a small about of acid may result in a very low pH. In one embodiment, purified water may be produced containing bicarbonate in a range that does not consume added $CO_2$ but also is of adequate concentration to provide adequate buffering capacity. Bicarbonate concentration in a water sample may be reflected in alkalinity measurements.

In one embodiment, purified water may be produced having a pH between 6 and 9 and preferably between 6.5 and 8.5. These ranges can be obtained by purifying the water with an electrochemical deionization device. The water may also contain some buffering capacity in the form of alkalinity. The water may be produced without blending two or more waters of differing pH and may be used for beverage production.

In one embodiment, water may be softened, that is, a concentration of calcium, magnesium and/or silica may be reduced and the process may result in a net reduction in ionic content. Unlike chemical ion exchange water softening techniques, electrochemical deionization techniques may remove cations such as calcium and magnesium without exchanging them for other cations such as sodium or potassium. In this manner, water can be softened while simultaneously reducing the total ion concentration of the water.

In another embodiment, an electrochemical deionization device may eliminate and/or reduce the quantity of viable microorganisms in a water supply. For example, bypassing the water to a depletion compartment in a CEDI or RCEDI device, a large proportion of any microorganisms that may be contained in the water can be rendered unviable by the operation of the device.

Conduit used in the system may be of any material capable of carrying water. It is preferred that the conduit is tubing of food-grade polymer. The tubing may be of a small diameter and may be as short as is practical, given peak flow and pressure requirements, to minimize the volume of water that is "stored" in the tubing during periods of non-use. In embodiments where storage may be desirable, a storage tank may be used. The storage tank may be in fluid communication with an electrochemical deionization device and may be positioned upstream or downstream of the electrochemical deionization device. The storage tank may have a volume of greater than 1 liter, greater than 5 liters or greater than 10 liters. A storage tank may be made of any material appropriate for storing water such as, for example, glass, polymeric material, and stainless steel. In appropriate embodiments, a storage tank may be of food grade material.

A controller may be, for example, a microprocessor or computer, such as a process logic controller (PLC). A controller may include several known components and circuitry, including a processing unit (i.e., processor), a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the controller may be a multi-processor computer system or may include multiple computers connected over a computer network.

The controller may include a processor, for example, a commercially available processor such as one of the series x86, Celeron and Pentium processors, available from Intel, similar devices from AMD and Cyrix, the 680X0 series microprocessors available from Motorola, and the PowerPC microprocessor from IBM. Many other processors are available, and the computer system is not limited to a particular processor.

A processor typically executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, communication control and related services. The processor and operating system together define a computer platform for which application programs in high-level programming languages are written. The controller used herein is not limited to a particular computer platform.

The controller may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has a number of tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of the controller also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the controller that implements the methods, steps, systems and system elements described herein and is not limited thereto. The controller is not limited to a particular memory system.

At least part of such a memory system described above may be used to store one or more data structures (e.g., look-up tables) or equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The controller may include a video and audio data I/O subsystem. An audio portion of the subsystem may include an analog-to-digital (A/D) converter, which receives analog audio information and converts it to digital information. The digital information may be compressed using known compression systems for storage on the hard disk to use at another time. A typical video portion of the I/O subsystem may include a video image compressor/decompressor of which many are known in the art. Such compressor/decompressors convert analog video information into compressed digital information, and vice-versa. The compressed digital information may be stored on hard disk for use at a later time.

The controller may include one or more output devices. Example output devices include a cathode ray tube (CRT) display, liquid crystal displays (LCD), touch screen display and other video output devices, printers, communication devices such as a modem or network interface, storage devices such as disk or tape, and audio output devices such as a speaker.

The controller also may include one or more input devices. Example input devices include a keyboard, keypad, track ball, mouse, pen and tablet, touch screen, communication devices such as described above, and data input devices such as audio and video capture devices and sensors. The controller is not limited to the particular input or output devices described herein.

The controller may include specially programmed, special purpose hardware, for example, an application-specific integrated circuit (ASIC). Such special-purpose hardware may be configured to implement one or more of the methods, steps, simulations, algorithms, systems, and system elements described above.

The controller and components thereof may be programmable using any of a variety of one or more suitable computer programming languages. Such languages may include procedural programming languages, for example, C, Pascal, Fortran and BASIC, object-oriented languages, for example, C++, Java and Eiffel and other languages, such as a scripting language or even assembly language.

The methods, steps, simulations, algorithms, systems, and system elements may be implemented using any of a variety of suitable programming languages, including procedural programming languages, object-oriented programming languages, other languages and combinations thereof, which may be executed by such a computer system. Such methods, steps, simulations, algorithms, systems, and system elements can be implemented as separate modules of a computer program, or can be implemented individually as separate computer programs. Such modules and programs can be executed on separate computers.

The methods, steps, simulations, algorithms, systems, and system elements described above may be implemented in software, hardware or firmware, or any combination of the three, as part of the controller described above or as an independent component.

Such methods, steps, simulations, algorithms, systems, and system elements, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system, or system element, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system, or system element.

Operation of an electrochemical deionization system may be controlled either manually or automatically. Preferably, operation is controlled automatically by a controller such as a PLC. The PLC (not shown) may be programmed to control some or all of the functions of the system. For instance, the PLC may control the point at which the polarity of the RCEDI stack is to be reversed and may concurrently operate the appropriate valves to direct the flow of water as outlined above. This may be triggered by a pre-programmed condition based on, for instance, time or total output, or may be a more active system that is controlled by variables such as water quality, flow rates or pressure differentials that may be measured or detected through the use of various meters and gauges throughout the system that communicate with the PLC. For example, when a decrease in water quality is detected in conduit 39, this may signal the PLC to reverse polarity and activate valves 80 and 81 to switch the depleting and concentrating compartments. The PLC may also indicate certain conditions to the operator of the system, such as when a carbon or particulate filter cartridge needs to be changed, or, if a consistent decrease in water pressure or quality is detected, the need for servicing the stack. Off-site facilities or personnel may also be notified by, for example, telephone, internet, or radio. A PLC may also be used to adjust the power to the stack. This may be particularly useful in response to changes in feed water quality, demand in water output, or if there is a decrease in the efficacy of the electrodes. For example, if the system is operating at a peak output of 3 gal/min and demand is suddenly increased to 4 gal/min, an increase in power to the stack may be all that is required to meet the removal requirements of the increased volume.

In some embodiments, purified water may be post-treated. For example, after purification, water may be disinfected or preserved with chemicals, filtration, radiation or any combination of these. Post-treatment may include, for example, chemical disinfection, such as with ozone, chlorine, chloramine or ammonia; heat disinfection, for example, by heating the purified water to greater than 50, 70 or 85 degrees C.; radiation disinfection, such as by irradiating with UV light; and by filtration, such as by using microfilters, sand filters and/or centrifugal sand filters that may be used to physically remove micro-organisms from the purified water. Post-treatment may be preferred when water is to be stored.

The present invention will be further illustrated by the following example, which is intended to be illustrative in nature and is not to be construed as limiting the scope of the invention.

EXAMPLE

To demonstrate the effectiveness of the present system, an RCEDI device was constructed and supplied with well water samples that contained compounds and exhibited properties that are of concern for fountain beverage production facilities. 14 different well water samples were initially analyzed for hardness, alkalinity, pH and TDS. The results of the initial pre-treatment analysis are summarized below in Table 1.

TABLE 1

| Feed Water Parameters | | | | |
|---|---|---|---|---|
| | Average | Median | High | Low |
| Hardness (ppm as $CaCO_3$) | 326 | 326 | 336 | 318 |
| Alkalinity (ppm as $CaCO_3$) | 258 | 254 | 278 | 246 |
| pH | 7.7 | 7.8 | 8.0 | 7.3 |
| TDS (ppm 442) | 533 | 533 | 537 | 527 |

Each of the water samples was treated by feeding the water through an RCEDI device having the following features.

| | |
|---|---|
| Device type: | 20 cell-pair CEDI system |
| Frequency of polarity reversal: | 10 minutes |
| Power Supply: | 200 watts |
| Flow Meters: | Three flow meters for measuring the dilute, concentrate, and electrode streams. |
| Pressure Gauges: | Five pressure gages to monitor feed, product, concentrate stream, electrode stream and feed prior to carbon and particulate treatment. |
| PLC: | Allen-Bradley MicroLogix 1000 PLC with four, double-pull, double-throw relays. |
| Electrodes: | Titanium plate electrodes with platinum coating of about 30 micro inches. |

The device was operated under conditions that would be practical for a fountain beverage installation. These parameters are shown below in Table 2 below.

TABLE 2

| System Parameters for the Reversal CEDI Module | | | | | |
|---|---|---|---|---|---|
| | Average | Median | High | Low | Number of Measurements |
| Product Flow (gpm) | 0.96 | 0.95 | 1.20 | 0.89 | 71 |
| Concentrate Flow (gpm) | 0.43 | 0.45 | 0.60 | 0.22 | 71 |
| Electrode Flow (gpm) | 0.11 | 0.11 | 0.13 | 0.07 | 71 |
| Current (amps) | 2.4 | 2.4 | 2.6 | 2.1 | 62 |
| Voltage (volts) | 130.5 | 127 | 151 | 89 | 61 |
| Pretreatment Feed Pressure (psi) | 39.4 | 40 | 51 | 28 | 79 |
| Stack Feed Pressure (psi) | 30.3 | 30 | 40 | 27 | 68 |
| Product Stream Pressure (psi) | 21.8 | 21 | 31 | 10 | 69 |
| Concentrate Stream Pressure (psi) | 26.9 | 26 | 38 | 15 | 69 |
| Electrode Stream Pressure (psi) | 12.5 | 10 | 34 | 5 | 69 |
| Product Pressure Drop (psid) | 8.5 | — | — | — | — |
| Concentrate Pressure Drop (psid) | 3.4 | — | — | — | — |

The properties of the water produced by the system were measured several times for each sample being treated. These results, as well as typical beverage water requirements, are summarized below in Table 3.

TABLE 3

Product Water Parameters for the Reversal CEDI Module

|  | Target Range | Average | Median | High | Low | Number of Samples |
|---|---|---|---|---|---|---|
| Hardness (ppm as $CaCO_3$) | $\leq$100 | 91 | 90 | 132 | 62 | 80 |
| Alkalinity (ppm as $CaCO_3$) | $\leq$85 | 71 | 70 | 109 | 52 | 80 |
| pH | 6.5-8.5 | 6.7 | 6.7 | 7.1 | 6.5 | 74 |
| TDS (ppm 442) | $\leq$500 | 166 | 165 | 227 | 122 | 80 |

The waste stream from the concentrating compartments and electrode compartments was also periodically analyzed during treatment. The results are shown below in Table 3.

TABLE 4

Concentrate/Electrode Water Parameters for the Reversal CEDI Module

|  | Average | Median | High | Low | Number of Samples |
|---|---|---|---|---|---|
| Hardness (ppm) | 732 | 736 | 934 | 604 | 65 |
| Alkalinity (ppm) | 515 | 528 | 624 | 402 | 65 |
| pH | 7.7 | 7.7 | 8.0 | 7.3 | 63 |
| TDS (ppm 442) | 1097 | 1104 | 1359 | 940 | 65 |

A comparison of the results measured in the feed water and the production water compared to the beverage water specification shows that the system provides an effective method for bringing a typical feed water into compliance with the beverage water requirements. The median results for hardness, alkalinity and TDS show that while the feed water was out of compliance for each of these parameters, the RCEDI process was effective at improving the water quality to the required level. It is also notable that the pH of the water was maintained at an acceptable level.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A water treatment system comprising:
   a feed water inlet;
   an electrochemical deionization device in fluid communication with the feed water inlet and comprising a treated water outlet; and
   a beverage production device in fluid communication with the treated water outlet.

2. The water treatment system of claim 1 further comprising a carbon filter upstream of the electrochemical deionization device.

3. The water treatment system of claim 2 wherein the beverage production device is a fountain beverage production device.

4. The water treatment system of claim 2 wherein the carbon filter comprises at least one of granular activated carbon, a carbon block, a cartridge filter, and zeolite.

5. The water treatment system of claim 1 further comprising a particulate filter upstream of the electrochemical deionization device.

6. The water treatment system of claim 5 wherein the particulate filter is a cartridge filter.

7. The water treatment system of claim 6 wherein the particulate filter comprises at least one of polypropylene and cotton.

8. The water treatment system of claim 1 wherein the electrochemical deionization device comprises a reversible continuous electrodeionization (RCEDI) device having at least one depleting compartment and at least one concentrating compartment.

9. The water treatment system of claim 8 wherein at least one of the depleting and concentrating components comprises a mixed-bed resin.

10. The water treatment system of claim 8 wherein at least one of the depleting and concentrating compartments includes a plurality of layered beds of ion exchange resin.

11. The water treatment system of claim 10 wherein at least one of the layered beds comprises cation and anion ion exchange resins.

12. The water treatment system of claim 11 wherein at least one of the layered beds comprises a doped ion exchange resin.

13. The water treatment system of claim 12 wherein at least one of the layered beds is substantially free of anion exchange resin.

14. The water treatment system of claim 12 wherein at least one of the layered beds is substantially free of cation exchange resin.

15. The water treatment system of claim 1 wherein the feed water inlet is in communication with a source of tap water.

16. The water treatment system of claim 15 wherein the feed water inlet is fluidly connected directly to a carbon filter and the electrochemical deionization device is fluidly connected downstream of the carbon filter.

17. The water treatment system of claim 1 wherein feed water from the feed water inlet comprises chlorinated water.

18. The water treatment system of claim 1 wherein the electrochemical deionization device is a device selected from the group consisting of an electrodialysis device, an electrodialysis reversible device, a capacitive deionization device, and an electrodeionization device.

19. The water treatment system of claim 1 wherein the beverage production device is in fluid communication with the treated water outlet via a conduit having a volume of less than one liter.

20. The water treatment system of claim 1 wherein the system is heat sanitizable.

21. The water treatment system of claim 1 wherein the electrochemical deionization device is heat sanitizable.

22. The water treatment system of claim 1 wherein the electrochemical deionization device is in communication with a controller configured to adjust one or more process conditions of the electrochemical deionization device in response to a qualtity of water from the treated water outlet.

23. The water treatment system of claim 22 wherein the one or more process conditions is a parameter selected from the group consisting of voltage, amperage, flow rate and reversal cycle.

24. The water treatment system of claim 22 wherein the controller is configured to adjust one or more process conditions of the electrochemical deionization device in response to a conductivity of water from the treated outlet.

25. A beverage dispensing system, comprising:
   a source of feed water;
   an electrochemical deionization device fluidly connected to the source of feed water; and
   a controller in communication with the electrochemical deionization device and configured to provide a control signal that regulates an operating parameter of the electrochemical deionization device to produce treated water having a hardness level in a range of from 5 ppm to 100 ppm, as CaCO$_3$, and an alkalinity level in a range of from 10 to 100 ppm, as CaCO$_3$, further comprising a beverage dispenser fluidly connected to a treated product water outlet of the electrochemical purification device.

26. A beverage dispensing system, comprising:

a source of feed water;

at least one electrodeionization device fluidly connected to the source of feed water and comprising an outlet of treated water;

a controller configured to regulate an operating parameter of the electrodeionization device based, at least partially, on a quality of the treated water; and a source of a syrup concentrate fluidly connected to the outlet of treated water.

27. The system of claim 26 further comprising an activated carbon filter fluidly connected between the source of feed water and an inlet of the electrodeionization device.

28. The system of claim 27 wherein the controller is configured to regulate the at least one operating parameter of the electrodeionization device to provide treated water having a hardness level of between 5 ppm to 100 ppm, as CaCO$_3$, and an alkalinity level of between 10 ppm to 100 ppm, as CaCO$_3$.

* * * * *